3,259,973
METHOD, FILLER ALLOY AND FLUX FOR BRAZING

Joseph F. Quaas, Island Park, and John P. Broderick, Bayside, N.Y., assignors to Eutectic Welding Alloys Corporation, Flushing, N.Y., a corporation of New York
No Drawing. Filed Mar. 11, 1963, Ser. No. 264,059
11 Claims. (Cl. 29—504)

This invention relates to the brazing of light metals such as aluminum and magnesium base alloys, and it more particularly relates to the brazing of such joints whose color matches that of the parent metals.

Most filler alloys for brazing a light metal such as aluminum contain enough aluminum to match the original color of the parent material. However brazed assemblies are often anodized to provide them with an attractive and protective finish, and the more effective existing aluminum filler alloys and brazing fluxes contain constituents which darken upon anodizing. This discolors the brazed area and spoils the appearance of the anodized assembly. Although joints brazed from pure aluminum filler rods do not blacken or discolor upon anodizing, pure aluminum has a relatively high melting point of approximately 1220° F. This requires the input of unduly high brazing heat which is likely to distort the materials being joined and to weaken the resultant joint in many ways.

An object of this invention is therefore to provide a method, a filler alloy and a flux for brazing strong joints between light metals such as magnesium or aluminum which do not discolor upon anodizing.

In accordance with this invention a flux essentially consisting of a mixture having a major portion ranging from 80 to 97% by weight thereof of alkali metal chlorides and a minor portion ranging from 3–20% by weight thereof of alkali metal type fluorides and including at least 1.0% of ammonium acid fluoride is applied to the joint area of a light metal such as an aluminum or magnesium base alloy. A particularly effective form of such a flux incorporates a mixture of potassium, sodium and lithium chlorides and a mixture of lithium and ammonium acid fluorides. Ammonium acid fluoride is described as an alkali metal type fluoride because the ammonium ion behaves chemically very much like the alkali metal ions.

Brazing heat is then applied to the parent metal for example by a brazing torch to decompose and activate the flux. A magnesium bearing aluminum filler alloy, which may contain minor additions up to 1.60% of strenghtening metals of the third series of the periodic system such as chromium, manganese and copper which do not discolor when anodized, is melted and bonded into the joint. Such a joint and the surrounding area of the parent metal perfectly match the normal color of aluminum or magnesium base alloys and do not darken or discolor when anodized.

The flux of this invention also improves the wetting action of the filler alloy, effectively reduces any magnesium oxide to soluble salts and does not contribute any heavy metals to the deposited filler alloy chemistry that are prone to discoloration. The filler alloy of this invention provides in conjunction with its flux a remarkably high strength joint in which neither the flux nor the filler alloy incorporate or contribute any constituents that blacken or discolor during anodizing.

A flux incorporating the following constituents in the indicated ranges and preferred examples of percentages by weight remarkably effectively fluxes light meals such as aluminum and magnesium for brazing.

| Constituents | Percentages by Weight | | |
|---|---|---|---|
| | Range | Preferred Range | Example |
| Potassium chloride | 30–70 | 55–65 | 60 |
| Sodium chloride | 10–30 | 12–18 | 15 |
| Lithium chloride | 10–40 | 15–25 | 17 |
| Lithium fluoride | 2–10 | 2–5 | 3 |
| Ammonium acid fluoride | 1–10 | 4–6 | 5 |

A flux of this type applied to a light metal such as aluminum or magnesium base alloys before a brazing operation effectively fluxes any magnesium oxide that might be formed during brazing and does not contribute any heavy metals to the deposited filler alloy chemistry that would make the resultant joints darken or discolor upon anodizing. In addition to the advantage of color matching this flux is also far more effective than prior fluxes incorporating heavy metals in enhancing the wetting ability and capillarity of the deposited filler alloy.

This flux is particularly effective in conjunction with a filler rod incorporating an aluminum base alloy containing magnesium which has a tendency to form aluminum and magnesium oxides in the brazing deposit. These oxides decrease the wetting ability and capillarity of the molten filler metal which is very likely to cause porosity and poor physical properties in the resultant joint. The ammonium acid fluoride in the flux of this invention takes any aluminum and magnesium oxides contributed by either the parent material or filler alloy into solution. The fluorine radical reacts with and reduces any magnesium oxide to form magnesium fluoride which is soluble in the resultant flux mass. Ammonium and hydrogen are emitted as gases, and the hydrogen further reduces any oxide formations that are formed and also further enhances the flow of the filler alloy.

This flux also has the advantage of readily flowing at temperatures well below the solidus temperature of highly desirable aluminum base magnesium bearing filler brazing alloys, and it remains active above the liquidus temperature of these alloys. This fully protects both the parent material and brazing alloy during the entire heating and cooling cycle. It also highly facilitates the wetting and spreading ability or capillarity of the filler alloy throughout the entire joint area. Remarkedly effective fluxing action on light metals such as aluminum or magnesium is thereby provided particularly with aluminum base and filler alloys containing amounts of magnesium with the added advantage of color matching of the brazed area with the parent material upon anodizing.

The aforementioned flux is applied to the joint area or filler rod or both, for example, as a dry powder or mixed with alcohol. It is decomposed by the application of heat to the fluxed parent metal, and the filler alloy is applied by standard brazing techniques. A uniquely effective filler alloy which provides remarkably strong brazed joints whose color perfectly matches that of the parent material even after anodizing is provided by the following compositions incorporating the following constituents in the indicated ranges and example of percentages by weight.

| Constituent | Percent by Weight | |
|---|---|---|
| | Range | Example |
| Magnesium | 0.8–5.2 | 5.0 |
| Chromium | 0.25 Max. | 0.15 |
| Manganese | 0.7 Max. | 0.7 |
| Copper | 0.15 Max. | 0.15 |
| Aluminum | Balance | Balance |

This type of filler rod in conjunction with the aforementioned brazing flux, particularly the combined examples, provide a remarkably strong brazed joint for aluminum base alloys that can be anodized without surface discoloration. The magnesium content highly strengthens the joint, and any oxides that are formed thereby are taken into solution by the fluxing constituents as previously described to prevent them from interfering with the wetting ability of the flux and the formation of a strong joint. The small amounts of chromium, manganese and minute additions of copper help form a remarkably strong brazed joint in which the deposited filler metal anodizes at the same rate and degree and therefore matches the color of most aluminum base parent materials used for structural applications, after anodizing either of the clear or color variety. Color matching of a color anodized joint area with the parent material is particularly difficult because a minor degree of mismatch is accentuated by color anodizing.

These unique filler alloys have a melting point approximately 100° F. lower than that of prior pure aluminum filler materials, which avoids the need for excessively high heat input and any resultant undue distortion of the metals being joined. Joints brazed with the filler alloys of this invention are far stronger than those incorporating pure aluminum filler metals which has relatively lower physical properties, and they avoid the tendency of previously used filler alloys containing silicon to darken and spoil the anodized appearance of their joints.

A particularly effective brazing operation can be conducted by utilizing the following ranges and preferred examples of filler alloy constituents in conjunction with the previously described flux compositions.

|  | Range of Percentages by Weight | | | |
| --- | --- | --- | --- | --- |
|  | I | II | III | IV |
| Magnesium | 4.5–5.2 | 4.0–4.5 | 2.5–4.0 | 0.8–2.5 |
| Chromium | 0.15 Max. | 0.20 Max. | 0.25 Max. | 0.25 Max. |
| Manganese | 0.7 Max. | 0.7 Max. | 0.7 Max. | 0.7 Max. |
| Copper | 0.15 Max. | 0.15 Max. | 0.15 Max. | 0.15 Max. |
| Aluminum | Balance | Balance | Balance | Balance |

What is claimed is:

1. A method of brazing a light metal which comprises the steps of applying a flux to said light metal essentially consisting of the following constituents in the indicated ranges of percentages by weight:

Constituents: Range
 Potassium chloride _____ 30–70
 Sodium chloride _____ 10–30
 Lithium chloride _____ 10–40
 Lithium fluoride _____ 2–10
 Ammonium acid fluoride _____ 1–10 applying heat to said fluxed light metal to activate said flux, and melting a filler alloy essentially consisting of the following constituents in the indicated ranges of percentages by weight upon said fluxed light metal at brazing temperatures:

Constituents: Range
 Magnesium _____ 0.8–5.2
 Chromium _____ 0.25 max.
 Manganese _____ 0.7 max.
 Copper _____ 0.15 max.
 Aluminum _____ Balance whereby the deposited filler alloy, and the light metal, upon anodizing, match in color.

2. A method of brazing a light metal which comprises the steps of applying a flux to said light metal essentially consisting of the following constituents in the indicated ranges of percentages by weight:

Constituents: Range
 Potassium chloride _____ 55–65
 Sodium chloride _____ 12–18
 Lithium chloride _____ 15–25
 Lithium fluoride _____ 2–5
 Ammonium acid fluoride _____ 4–6 applying heat to said fluxed light metal to activate said flux, and melting a filler alloy essentially consisting of the following constituents in the indicated ranges of percentages by weight upon said fluxed parent alloy at brazing temperatures:

Constituents: Range
 Magnesium _____ 4.5–5.2
 Chromium _____ 0.15 max.
 Manganese _____ 0.7 max.
 Copper _____ 0.15 max.
 Aluminum _____ Balance 3. A method of brazing a light metal which comprises the steps of applying a flux to said light metal essentially consisting of the following constituents in the indicated ranges of percentages by weight:

Constituents: Range
 Potassium chloride _____ 55–65
 Sodium chloride _____ 12–18
 Lithium chloride _____ 15–25
 Lithium fluoride _____ 2–5
 Ammonium acid fluoride _____ 4–6 applying heat to said fluxed light metal to activate said flux, and melting a filler alloy essentially consisting of the following constituents in the indicated ranges of percentages by weight upon said fluxed metal at brazing temperatures:

Constituents: Range
 Magnesium _____ 4.0–4.5
 Chromium _____ 0.20 max.
 Manganese _____ 0.7 max.
 Copper _____ 0.15 max.
 Aluminum _____ Balance 4. A method of brazing a light metal which comprises the steps of applying a flux to said light metal essentially consisting of the following constituents in the indicated ranges of percentages by weight to said light metal:

Constituents: Range
 Potassium chloride _____ 55–65
 Sodium chloride _____ 12–18
 Lithium chloride _____ 15–25
 Lithium fluoride _____ 2–5
 Ammonium acid fluoride _____ 4–6 applying heat to said fluxed light metal to activate said flux, and melting a filler alloy essentially consisting of the following constituents in the indicated ranges of percentages by weight upon said fluxed light metal at brazing temperatures:

Constituents: Range
 Magnesium _____ 2.5–4.0
 Chromium _____ 0.25 max.
 Manganese _____ 0.7 max.
 Copper _____ 0.15 max.
 Aluminum _____ Balance whereby the deposited filler alloy, and the light metal, upon anodizing, match in color.

5. A method of brazing a light metal which comprises the steps of applying a flux to said light metal essentially consisting of the following constituents in the indicated ranges of percentages by weight to said light metal:

| Constituents: | Range |
|---|---|
| Potassium chloride | 55–65 |
| Sodium chloride | 12–18 |
| Lithium chloride | 15–25 |
| Lithium fluoride | 2–5 |
| Ammonium acid fluoride | 4–6 | applying heat to said fluxed light metal to activate said flux, and melting a filler alloy essentially consisting of the following constituents in the indicated ranges of percentages by weight upon said fluxed light metal at brazing temperatures:

| Constituents: | Range |
|---|---|
| Magnesium | 0.8–2.5 |
| Chromium | 0.25 max. |
| Manganese | 0.7 max. |
| Copper | 0.15 max. |
| Aluminum | Balance | whereby the deposited filler alloy, and the light metal, upon anodizing, match in color.

6. A filler rod for brazing a light metal essentially consisting of the following constituents in the indicated ranges of percentages by weight:

| Constituents: | Range |
|---|---|
| Magnesium | 4.0–5.2 |
| Chromium | 0.25 max. |
| Manganese | 0.7 max. |
| Copper | 0.15 max. |
| Aluminum | Balance |

7. A filler rod for brazing a light metal essentially consisting of the following constituents in the indicated ranges of percentages by weight:

| Constituents: | Range |
|---|---|
| Magnesium | 4.5–5.2 |
| Chromium | 0.15 max. |
| Manganese | 0.7 max. |
| Copper | 0.15 max. |
| Aluminum | Balance |

8. A filler rod for brazing a light metal essentially consisting of the following constituents in the indicated ranges of percentages by weight:

| Constituents: | Range |
|---|---|
| Magnesium | 4.0–4.5 |
| Chromium | 0.20 max. |
| Manganese | 0.7 max. |
| Copper | 0.15 max. |
| Aluminum | Balance |

9. A filler rod for brazing a light metal essentially consisting of the following constituents in the indicated ranges of percentages by weight:

| Constituents: | Range |
|---|---|
| Magnesium | 3.5–4.0 |
| Chromium | 0.25 max. |
| Manganese | 0.7 max. |
| Copper | 0.15 max. |
| Aluminum | Balance |

10. A brazing flux composition essentially consisting of the following constituents in the indicated ranges of percentages by weight:

| Constituents: | Range |
|---|---|
| Potassium chloride | 30–70 |
| Sodium chloride | 10–30 |
| Lithium chloride | 10–40 |
| Lithium fluoride | 2–10 |
| Ammonium acid fluoride | 1–10 |

11. A brazing flux composition essentially consisting of the following constituents in the indicated ranges of percentages by weight:

| Constituents: | Range |
|---|---|
| Potassium chloride | 55–65 |
| Sodium chloride | 12–18 |
| Lithium chloride | 15–25 |
| Lithium fluoride | 2–5 |
| Ammonium acid fluoride | 4–6 |

References Cited by the Examiner

UNITED STATES PATENTS

| | | | |
|---|---|---|---|
| 2,003,297 | 6/1935 | Keller et al. | 75—142 |
| 2,280,173 | 4/1942 | Stroup | 75—142 |
| 2,867,037 | 1/1959 | Lawton | 148—26 |

JOHN F. CAMPBELL, *Primary Examiner.*

P. M. COHEN, *Assistant Examiner.*